United States Patent
Saarenpää

(10) Patent No.: US 6,839,418 B1
(45) Date of Patent: Jan. 4, 2005

(54) METHOD FOR DIFFERENTIATED TREATMENT OF CALLING SUBSCRIBERS

(75) Inventor: Matti Saarenpää, Tampere (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/674,437

(22) PCT Filed: May 6, 1999

(86) PCT No.: PCT/EP99/03129
§ 371 (c)(1),
(2), (4) Date: Apr. 3, 2001

(87) PCT Pub. No.: WO99/59319
PCT Pub. Date: Nov. 18, 1999

(30) Foreign Application Priority Data

May 12, 1998 (EP) ............................................ 98108573

(51) Int. Cl.$^7$ .............................................. H04M 3/42
(52) U.S. Cl. ............................ 379/211.02; 379/207.12; 379/207.14; 379/213.01
(58) Field of Search ...................... 379/114.24, 207.14, 379/207.15, 211.02, 213.01, 220.01, 221.01, 221.08, 221.15, 243, 901, 207.12

(56) References Cited

U.S. PATENT DOCUMENTS

| 4,757,267 A | * | 7/1988 | Riskin ................... 379/114.24 |
| 5,136,636 A | * | 8/1992 | Wegrzynowicz ....... 379/221.01 |
| 5,291,550 A | * | 3/1994 | Levy et al. ................. 379/242 |
| 5,588,048 A | * | 12/1996 | Neville .................. 379/127.01 |
| 5,805,688 A | * | 9/1998 | Gillespie et al. ....... 379/221.08 |
| 5,982,868 A | * | 11/1999 | Shaffer et al. ......... 379/220.01 |
| 6,097,802 A | * | 8/2000 | Fleischer, III et al. .. 379/211.02 |
| 6,130,935 A | * | 10/2000 | Shaffer et al. ......... 379/127.03 |
| 6,163,597 A | * | 12/2000 | Voit ........................ 379/93.17 |

* cited by examiner

Primary Examiner—Bing Q. Bui
(74) Attorney, Agent, or Firm—Cohen, Pontani, Lieberman & Pavane

(57) ABSTRACT

A method and exchange unit in a telecommunication system for differentiated treatment of calling subscribers special calls includes separating from normal calls according to information contained in the dialed number, i.e., the routing number. If the call is determined to be a special call, the routing number is modified by adding a new digit string to the routing number depending on a subscriber associated parameter. The modified number is then evaluated for further treatment of the call.

25 Claims, 1 Drawing Sheet

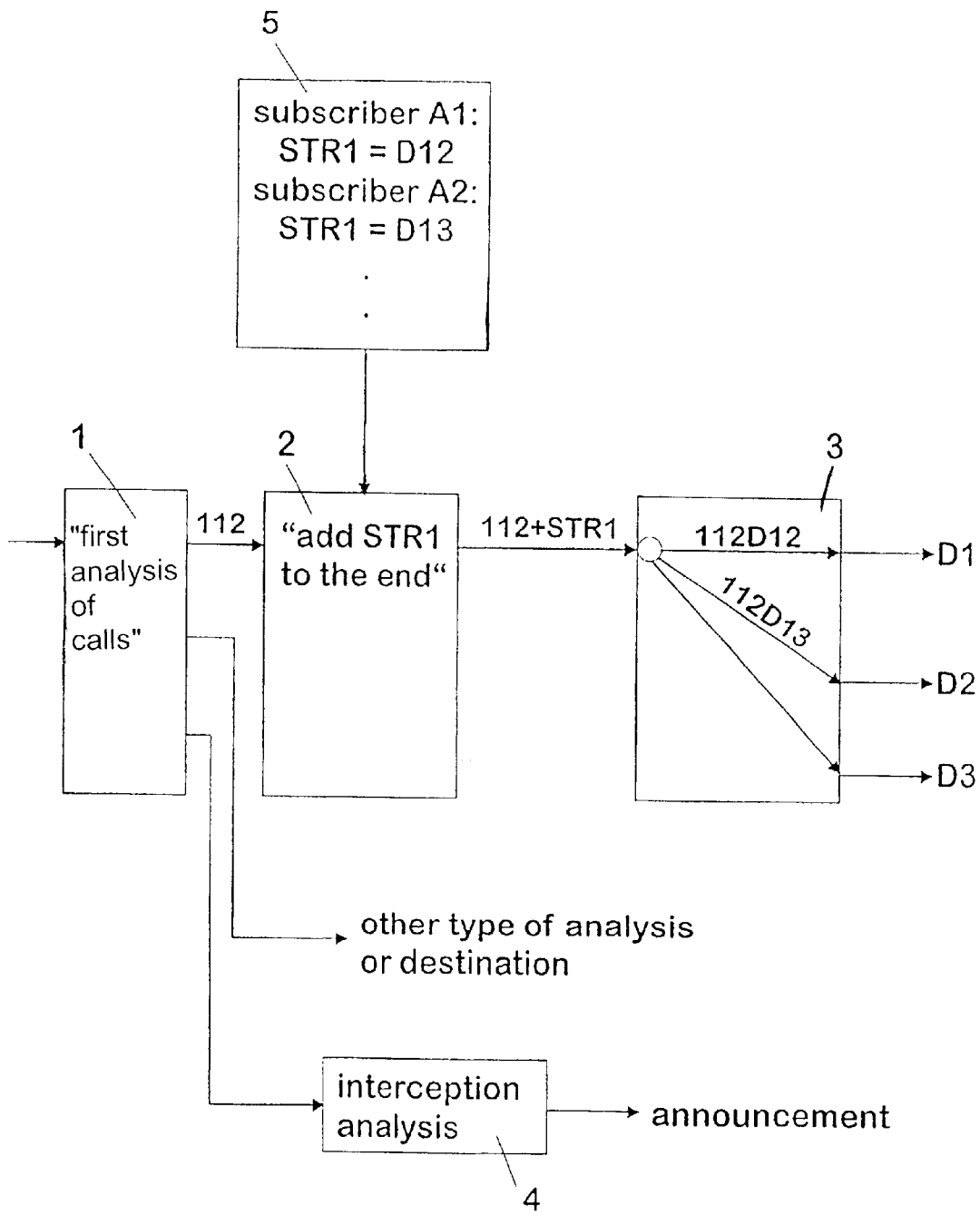

METHOD FOR DIFFERENTIATED TREATMENT OF CALLING SUBSCRIBERS

PRIORITY CLAIM

This is a national stage of PCT application no. PCT/EP99/03129, filed on May 6, 1999. Priority is claimed on that application and on patent application no. 98 108 573.1, file in EPO on May 12, 1998.

FIELD OF THE INVENTION

The invention relates to a method for differentiated treatment of calling subscribers, The invention moreover relates to an exchange unit in a telecommunication network comprising a subscriber data base and means for a first analysis for separating calls for the further treatment depending on the called number.

BACKGROUND OF THE INVENTION

Telecommunication companies have been using analyses where a call by a subscriber using a certain emergency number or service number is routed to the nearest emergency or other service center located e.g. in the same district by evaluating information about the origin of the call. A disadvantage of this analysis lies in the fact that the call origins affect the whole analysis and not only the routing to the emergency or service numbers. Also there are different needs for the origins with different services, but there is no flexible way to provide several origins for different purposes. Another disadvantage is that the currently used analysis schemes may be unnecessarily complicated and error prone. Copying of analyses has been required also in an undesired way. This invention contains a simple and easy-to-use way to handle call origin information in the number translation.

SUMMARY OF THE INVENTION

There is a demand for an improved and flexible possibility of differentiated treatment of calls based on some parameter like the geographical location or some other service-specific parameter assigned to the calling subscriber. The parameters are moreover needed for both, subscriber extensions and private branch exchanges (PBX).

It is an object of the invention to provide such a possibility.

This object is achieved by a method for differentiated treatment of calling subscribers according to at least one subscriber associated parameter assigned to each connection between a calling subscriber and a special called party, especially a service provider, comprising the steps of carrying out a first analysis for separating special calls from normal calls according to information contained in a dialed number, modifying the routing number of selected special calls in a second analysis by introducing at least one new digit string depending on a subscriber associated parameter to the routing number of the call, and evaluating the modified routing number for further treatment of the call, or sending it to the outgoing signaling as additional information for further use.

This object is equally achieved by an exchange unit according to the preamble, where the subscriber data base comprises at least one additional parameter for all subscribers defining a subscriber attribute, the exchange unit comprises means for introducing a digit string depending on the additional parameter associated to the calling subscriber at some place of a called number selected by the first analysis for such treatment, and the exchange unit comprises means for a second analysis for determining the destination of the call by evaluating the modified routing number.

The method and the exchange unit according to the invention permit a differentiated treatment of calling subscribers depending on the B-number they call. The inventive method and exchange unit give the operator free hands to configure the system to implement a wide variety of special features quickly and without a new software release. The introduced digit strings are not dedicated to any purpose as such, avoiding the disadvantage of commonly used dedicated routing features which are assigned to location, language, category, etc. of the subscriber. The method may also offer remedy in cases when several routing related features are interacting with one another.

The method according to the invention can be applied to e.g. emergency calls and certain local service calls, e.g. pizza delivery or cab service. In addition, it can be used by service providers with different charging or different terminals for different customer groups. The proposed method may also be used in the case of calls to destinations with poor signaling capabilities, e.g., if the number of the calling party is not passed towards the called party.

The exchange unit of the invention may store in its subscriber data base the digit strings that can be introduced themselves. Less space, though, is required in this data base, if there is at least one reference provided in the database, pointing at an additional table, in which the digit strings that can be introduced for each subscriber are stored.

Other preferred embodiments of the invention can be taken from the dependent claims.

Other objects and features of the present invention will become apparent from the following detailed description considered in conjunction with the accompanying drawings. It is to be understood, however, that the drawings are intending solely for purposes of illustration and not as a definition of the limits of the invention, for which reference should be made to the appended claims.

BRIEF DESCRIPTION OF THE DRAWING

In the following, the invention is explained in more detail with reference to the only FIGURE, which illustrates a preferred embodiment of the method and the exchange unit according to the invention.

DETAILED DESCRIPTION OF THE PRESENTLY PREFERRED EMBODIMENT

In the FIGURE, elements of an exchange unit of a telecommunication network are shown, the elements being principally restricted to those relevant for the invention. The exchange unit is provided with calls originating from calling subscribers (indicated by the arrow on the left side of the FIGURE). It comprises different possibilities for treatment and evaluation of these calls and outputs them to different destinations for further routing of the call to the called subscriber depending on the results of the evaluations. The different steps (step 1–step 3) of the presented embodiment of the inventive method, which enable the operator to route an incoming call according to a newly introduced digit string, become apparent as well.

The FIGURE shows as step 1 a first analysis of calls coming in from subscriber A-lines, comprising an input and several possibilities for the output. The output of the first analysis (step 1) can either be supplied to a number translation (step 2), to an interception analysis 4 or to some other type of analysis or destination. The number translation (step 2) is depending on a second input, provided by the database 5 of the exchange unit containing subscriber data. To each subscriber there is associated in this database 5 at least one digit string STR1, the value of which does not have to be set. Alternatively, the database 5 may contain a reference to additional tables, in which new parameters are stored. The output of the number translation (step 2) is transmitted to a second analysis (step 3).

All requested calls pass the first analysis (step 1). Only for special calls, e.g. emergency calls there may be provided another analysis, which is carried out first for separating them for a special emergency call handling. The first analysis (step 1) is used for separating calls according to the required further treatment depending on the incoming dialed B-number. Some B-numbers may call for an interception analysis 4 leading to a certain announcement, as known in the state of the art. "Normal" calls that do not require special treatment and all other calls that have to undergo some other treatment known in the state of the art are routed conventionally, indicated in the figure by "other type of analysis or destination".

Some "special" calls, though, especially certain service calls, are forwarded to the number translation (step 2). In this number translation there is included the instruction e.g. "add STR1 to the end" of the received routing number.

The number translation receives the needed value of STR1 from the database 5. In this database is stored at least one new parameter, e.g. the parameter STR1, defining a subscriber attribute for each subscriber. In the figure, the value of a digit string STR1 is "D12" for subscriber A1 and "D13" for subscriber B2. Equally, there is assigned a value to STR1 for other subscribers. For some subscribers the value may be "default". The different values that can be assigned to digit string STR1 define, e.g., different location areas in which the calling subscriber is located.

The number translation (step 2) adds the value of STR1 to the end of the received number. If the received number is "112", the number translation (step 2) would output "112+STR11". In case the call originates from subscriber A1, this would be "112D12". The digit string that is additionally introduced in the routing number during number translation may as well be added at the beginning of the received number or at a defined place in the middle of it, depending on what is most suitable for the analysis scheme. The resulting string is passed on to a second analysis (step 3) for further evaluation.

In the FIGURE, the second analysis (step 3) is used for routing the call to different destinations D1, D2, D3, depending on the digit string STR1 that was added. If the number "112" was dialed by subscriber A1 and digit string "D13" was added, the call is routed to destination D1. If the number "112" was dialed by subscriber A2 and digit string "D13" was added, the call is routed to destination D2. In this way, a single number can be used in the whole country for a service, and still the call is routed to a service center located in the same or closest to the area in which the calling subscriber is located. Such a procedure can be of interest for a variety of service providers, e.g., for emergency calls, pizza delivery or cab service. The evaluation of the information can be done by an IN service.

The added string STR1 may be removed again in another number translation (not shown), if it is not needed for further routing or at the destination of the call.

The information contained in the newly introduced parameter is not restricted to data about the location origin of the calling subscriber. Other data that can be used may refer to a specific requested service and may be transmitted to the service provider for evaluation or be evaluated in the exchange unit. Examples for such data are special charging rates for different customers or permission of access to the service. Accordingly, the information is not necessarily used for routing. The calling subscriber related information may be included for example, in addition to the standardized calling party category values, at the end of the called address, where it does not affect routing or charging, but can be delivered to the called party, if the subscriber signaling supports the address transfer (e.g. DSS1). For example an Intelligent Peripheral service node may use this data to differentiate between customers for the providing of a service. In contrast to the interception analysis shown in the figure, interception announcements may also be varied depending on the calling subscriber.

A chosen number of digit strings or digit string references are stored in the subscriber data of the exchange unit. The reference may be an index which is pointing to the place in the digit string table header where the reference to the actual storage location of the digits is found. The maximum length of the digit string and the maximum amount of them can be chosen as desired. The digit string may also contain overdecadic values like STR1=D12 in the described embodiment. If the interesting parameter is the location origin, of course one digit string can be used for all services for which location information is important for further routing of the call.

The term "subscribers" implies also private automatic branch exchanges (PABXs) and even indirect subscribers. All the definitions of digit strings, addresses and number translations are made using Operator's Man Machine Interface (MMI).

Other parts of the number translation result, which contain deletion and/or addition of digits irrespective of the calling party, are not affected by this new parameter. Only the order of execution of the translations has to be defined.

The above described method and exchange unit are usable with all trunk signalings, because the called address is passed by them all.

Additionally or alternatively to the described method and exchange unit, a dialing pre-analysis may be used, for which digits are added at the beginning of the dialing or at some other places in the number sequence. The received dialed number is then modified before the actual digit analysis. For example, some digits may be removed from the beginning of the dialed number or the type of number be modified.

Thus, while there have been shown and described and pointed out fundamental novel features of the present invention as applied to a preferred embodiment thereof, it will be understood that various omissions and substitutions and changes in the form and details of the devices illustrated, and in their operation,may be made by those skilled in the art within departing from the spirit of the present invention. For example, it is expressly intended that all combinations of those elements and/or steps which perform substantially the same function in substantially the same way to achieve the same results are within the scope of the invention. Substitution of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The routing of emergency and service calls from different geographical areas can also be implemented by modifying or copying the existing analyses. In this case, the problems described in the introduction have to be considered.

What is claimed is:

1. Method for differentiated treatment of calling subscribers according to at least one subscriber associated parameter assigned to each connection between a calling subscriber and a special called party, comprising the steps of:

carrying out a first analysis (1) for separating special calls from normal calls according to information contained in a dialed routing number, modifying the routing number of selected special calls in a second analysis (2) by introducing at least one new digit string depending on a subscriber associated parameter to the routing number of the call such that the at least one new digit string is added to the routing number of the call, and evaluating the modified routing number for further treatment of the call, wherein the at least one new digit string defines a destination of the call.

2. Method according to claim 1, characterized in that the modified routing number is evaluated for appropriate routing of the call.

3. Method according to claim 1, characterized in that the modified routing number is sent to the outgoing signaling as additional information for evaluation for further use.

4. Method according to claim 1, characterized in that the subscriber is a normal subscriber, a PBX (public branch exchange) or an indirect subscriber entering the network via some other network or service provider.

5. Method according to claim 1, characterized in that one of the at least one subscriber associated parameters contains information concerning the location, especially some district, of the calling subscriber.

6. Method according to claim 1, characterized in that one of the at least one subscriber associated parameters contains information concerning the access permission to a certain service.

7. Method according to claim 1, characterized in that one of the at least one subscriber associated parameters contains information resulting in different interception announcements.

8. Method according to claim 1, characterized in that the subscriber associated parameter contains information concerning different charging for different calling subscribers.

9. Method according to claim 1, characterized in that the subscriber associated parameter contains information concerning different routing for different calling subscribers.

10. Method according to claim 1, characterized in that the subscriber associated parameter contains information concerning networks of different operators to which a call has to be routed.

11. Method according to claim 1, characterized in that the subscriber associated parameter contains information concerning a different kind of network to which a call has to be routed.

12. Method according to claim 1, characterized in that the subscriber associated parameter contains information concerning a different routing service quality that has to be provided for different calling subscribers.

13. Method according to claim 1, characterized in that the separation of special calls from normal calls in a first analysis is based on an attribute of the number of the called subscriber.

14. Method according to claim 1, characterized in that a dialing pre-analysis is carried out.

15. Use of the method according to claim 1 in one of a narrowband and a broadband telecommunication system.

16. Method according to claim 1, wherein the at least one new digit string is applicable to more than one type of special call.

17. Method according to claim 1, wherein said step of evaluating is performed by an Intelligent Network service.

18. Method according to claim 1, wherein said step of modifying the routing number includes adding the at least one new digit string as a suffix to the routing number.

19. Exchange unit in a telecommunication network comprising a subscriber data base and means for a first analysis of incoming calls from calling subscribers in order to separate calls for further treatment depending on the called routing number prior to routing the individual calls to the appropriate subscribers, characterized in that:

the subscriber data base comprises at least one additional parameter for all subscribers defining a subscriber attribute, the exchange unit comprises means for introducing a digit string depending on the additional parameter associated to the calling subscriber at some place of the called routing number selected by the first analysis for such treatment such that the digit string is added to the routing number of the call, and the exchange unit comprises means for a second analysis for determining the destination of the call by evaluating the modified routing number, wherein the digit string defines a destination of the call.

20. Exchange unit according to claim 19, characterized in that the additional parameter stored in the subscriber data base is the digit string that is to be introduced.

21. Exchange unit according to claim 19, characterized in that the additional parameter stored in the subscriber data base is a reference pointing at an additional table in which the digit string that is to be introduced is stored.

22. Use of the exchange unit according to claim 19 in one of a narrowband and a broadband telecommunication system.

23. Exchange unit according to claim 19, wherein the digit string is applicable to more than one type of special call.

24. Exchange unit according to claim 19, wherein said means for a second analysis for determining the destination of the call is part of an Intelligent Network service.

25. Exchange unit according to claim 19, wherein the means for introducing a digit string comprises means for adding the digit string as a suffix to the routing number of the call.

* * * * *